United States Patent
Nguyen et al.

(10) Patent No.: US 10,330,291 B2
(45) Date of Patent: Jun. 25, 2019

(54) HIDDEN MOUNTING SYSTEM FOR LUMINAIRE

(71) Applicant: CORDELIA LIGHTING, INC., Rancho Dominguez, CA (US)

(72) Inventors: Huan C. Nguyen, Pacentia, CA (US); Aaron O'Brien, Los Alamitos, CA (US)

(73) Assignee: CORDELIA LIGHTING INC., Rancho Dominguez, CA (US)

( * ) Notice: Subject to any disclaimer, the term of this patent is extended or adjusted under 35 U.S.C. 154(b) by 154 days.

(21) Appl. No.: 15/660,923

(22) Filed: Jul. 26, 2017

(65) Prior Publication Data
US 2018/0031212 A1    Feb. 1, 2018

Related U.S. Application Data

(60) Provisional application No. 62/367,031, filed on Jul. 26, 2016.

(51) Int. Cl.
| | |
|---|---|
| *F21V 21/03* | (2006.01) |
| *F21S 8/02* | (2006.01) |
| *F21V 21/04* | (2006.01) |
| *F21V 8/00* | (2006.01) |
| *F21Y 103/20* | (2016.01) |
| *F21V 17/10* | (2006.01) |
| *F21V 15/01* | (2006.01) |
| *F21V 3/06* | (2018.01) |
| *F21Y 105/00* | (2016.01) |
| *F21Y 115/10* | (2016.01) |

(52) U.S. Cl.
CPC .............. *F21V 21/03* (2013.01); *F21S 8/026* (2013.01); *F21V 21/04* (2013.01); *G02B 6/0091* (2013.01); *F21V 3/061* (2018.02); *F21V 3/062* (2018.02); *F21V 15/01* (2013.01); *F21V 17/108* (2013.01); *F21Y 2103/20* (2016.08); *F21Y 2105/00* (2013.01); *F21Y 2115/10* (2016.08)

(58) Field of Classification Search
CPC ....... G02B 6/0091; F21V 21/03; F21V 21/04; F21V 3/062; F21V 3/061; F21V 17/108; F21V 15/01; F21S 8/026; F21Y 2105/00; F21Y 2115/10; F21Y 2103/20
See application file for complete search history.

(56) References Cited

U.S. PATENT DOCUMENTS

| | | |
|---|---|---|
| 5,613,751 A | 3/1997 | Parker et al. |
| 6,079,838 A | 6/2000 | Parker et al. |

(Continued)

*Primary Examiner* — David V Bruce
(74) *Attorney, Agent, or Firm* — Paul Y. Feng; One LLP

(57) ABSTRACT

A panel light fixture kit for mounting to a planar surface of a dwelling. The kit includes a mounting plate for a flush mount to the planar surface. A frame mounts to and covers the mounting plate. The mounting plate includes alignment notches. The frame includes a tunnel cover that slides into the alignment notches to align the two parts during installation. The mounting plate further includes eyelet slots. The frame has attachment pins that slide into the eyelet slots to hold the frame to the mounting bracket. An LED light source inside the frame illuminates a light guide panel positioned at the bottom. In a T-bar drop ceiling application, the mounting plate is not needed. The frame includes bendable T-bar brackets that are bent to a hook shape that is fastened to the T-bar to affix the frame to the T-grid.

18 Claims, 3 Drawing Sheets

(56) References Cited

U.S. PATENT DOCUMENTS

| | | | |
|---|---|---|---|
| 6,539,656 B2 | 4/2003 | Maas et al. | |
| 6,712,481 B2 | 3/2004 | Parker et al. | |
| 7,160,015 B2 | 1/2007 | Parker | |
| 7,374,327 B2 | 5/2008 | Schexnaider | |
| 7,703,967 B2 | 4/2010 | Parker | |
| 7,798,695 B2 | 9/2010 | Parker | |
| 7,963,687 B2 | 6/2011 | Parker | |
| 7,997,784 B2 | 8/2011 | Tsai | |
| 8,096,671 B1 | 1/2012 | Cronk et al. | |
| 8,123,393 B2 | 2/2012 | Parker | |
| 8,142,063 B2 | 3/2012 | Parker | |
| 8,602,631 B2 | 12/2013 | Tsai et al. | |
| 8,814,410 B2 | 8/2014 | McCollum et al. | |
| 8,915,636 B2 | 12/2014 | Araki et al. | |
| 9,335,036 B2 | 5/2016 | Myers et al. | |
| 9,423,113 B2 | 8/2016 | Myers et al. | |
| 9,581,756 B2 | 2/2017 | Boomgaarden et al. | |
| 2011/0205757 A1* | 8/2011 | Whyte | F21S 2/005 362/607 |
| 2013/0135898 A1* | 5/2013 | Horikawa | G02B 6/0091 362/609 |
| 2014/0268874 A1* | 9/2014 | Clements | F21S 8/04 362/612 |

* cited by examiner

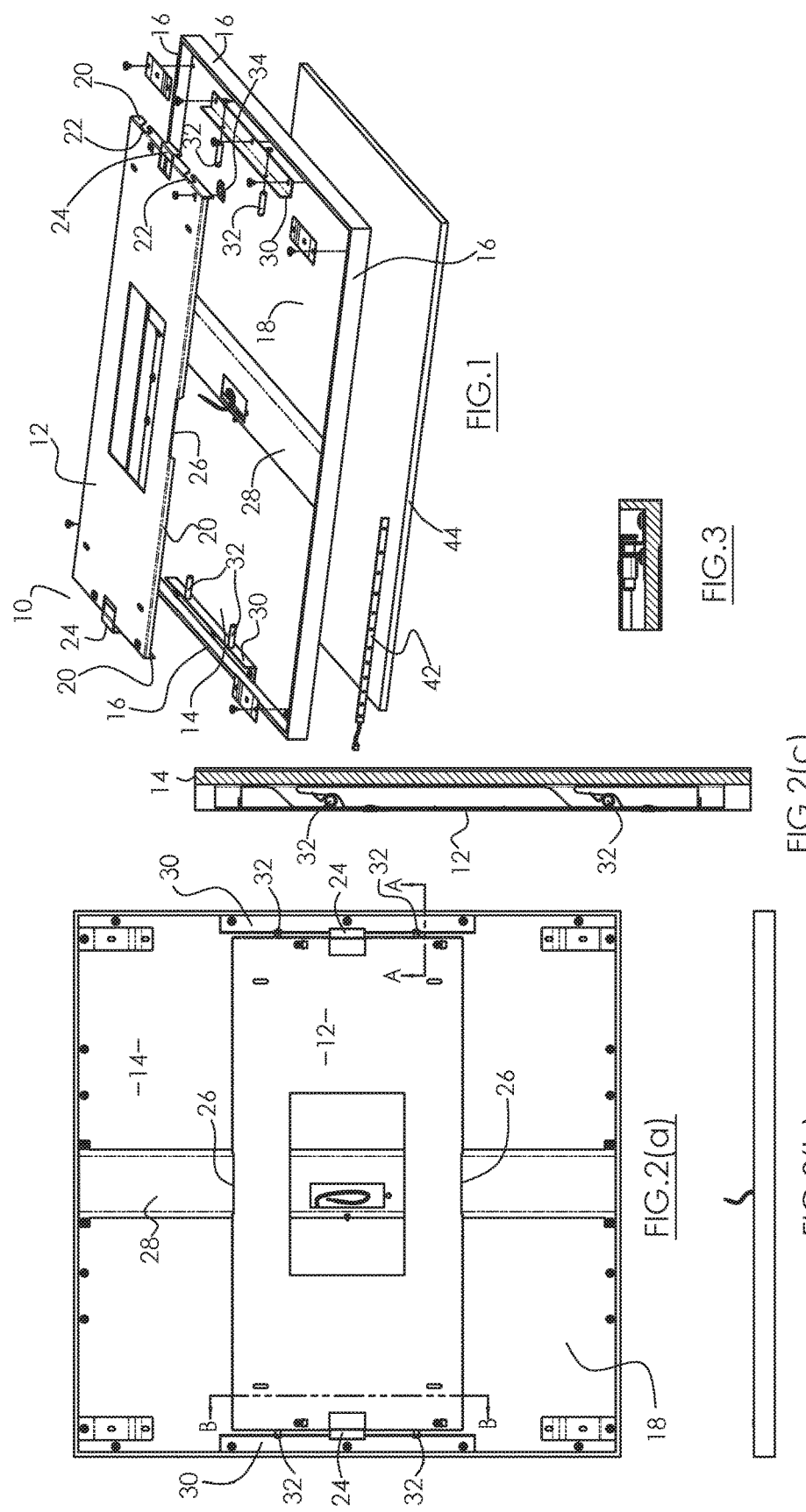

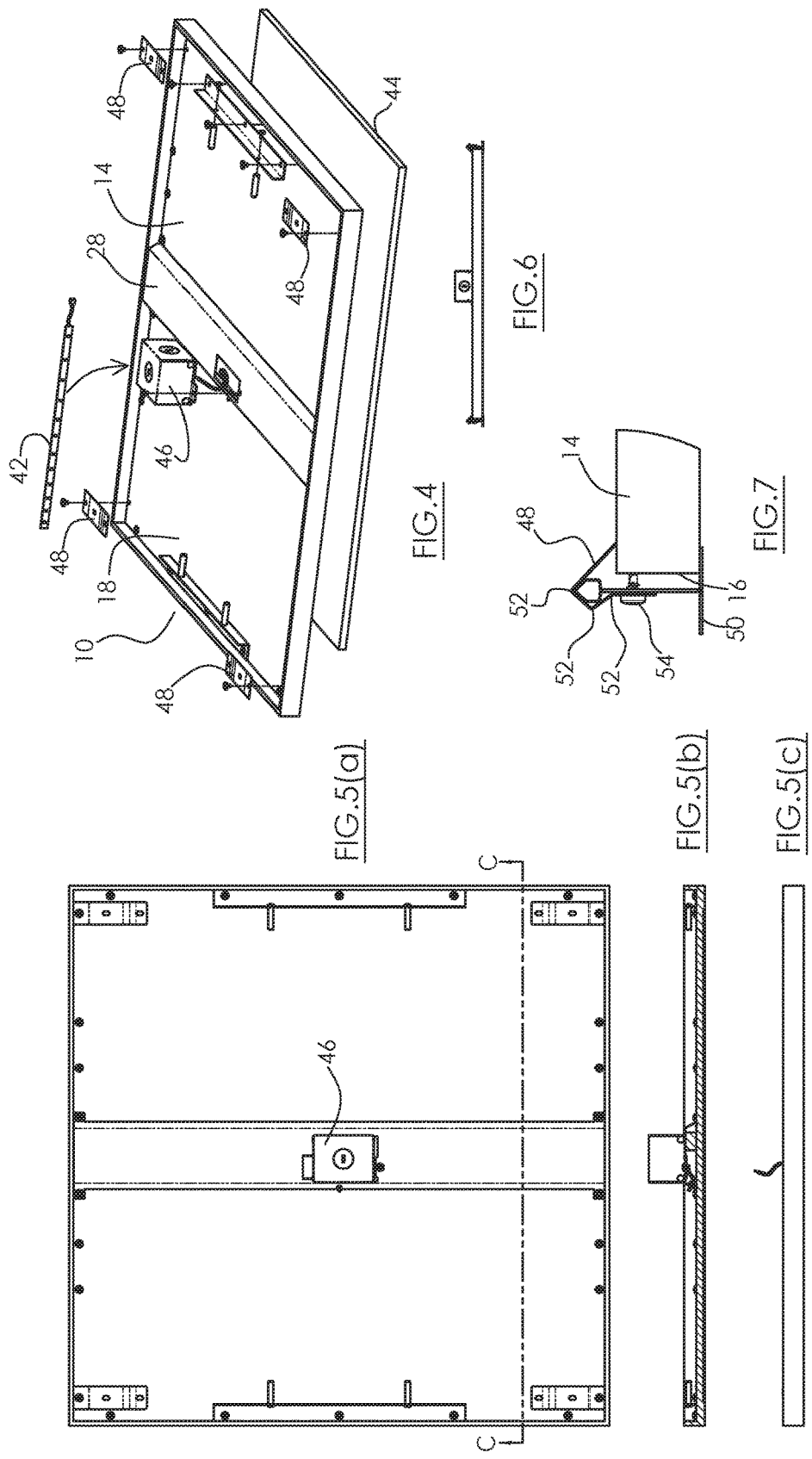

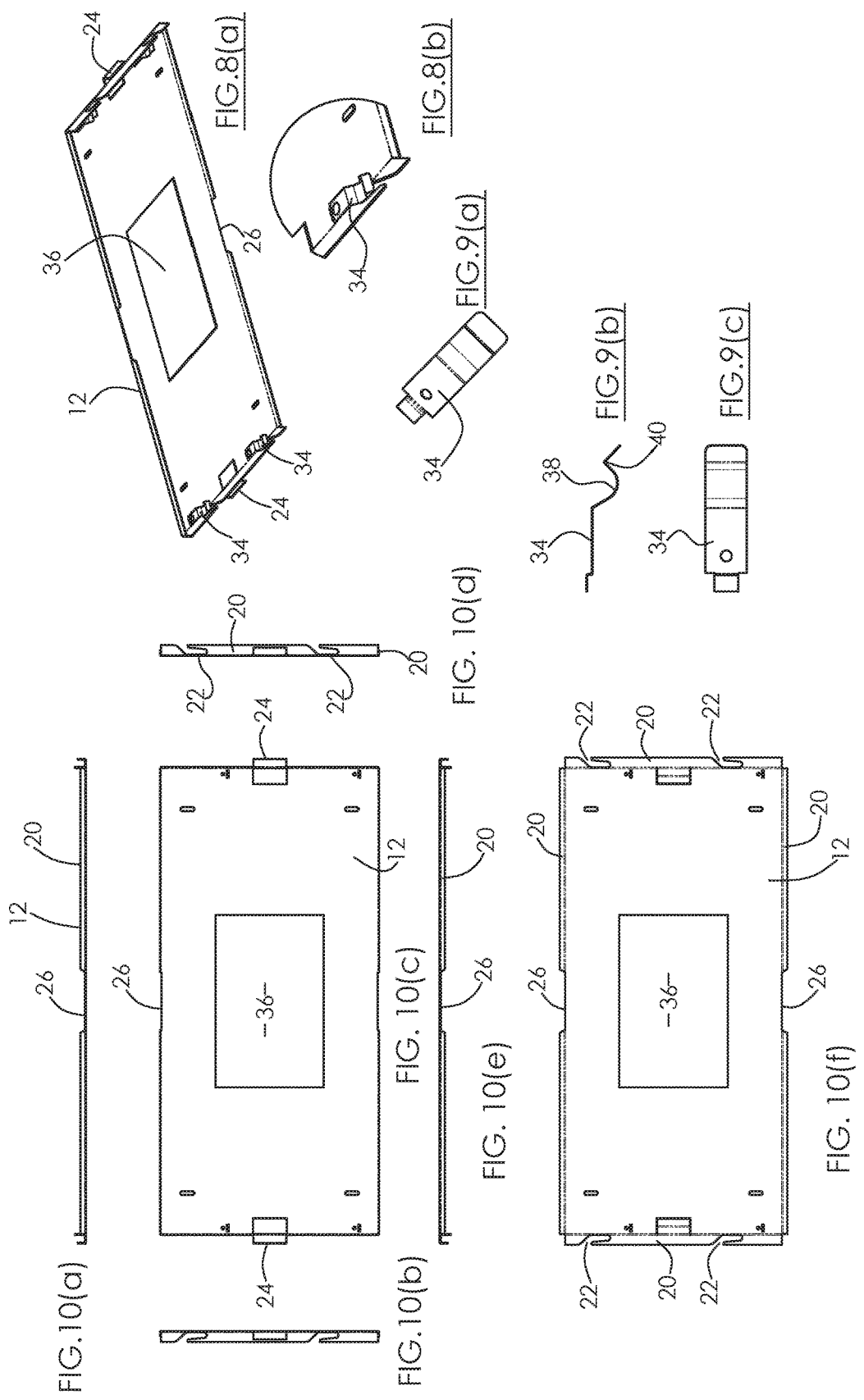

HIDDEN MOUNTING SYSTEM FOR LUMINAIRE

CROSS-REFERENCE TO RELATED APPLICATIONS

This application claims benefit of priority to provisional application No. 62/367,031, filed Jul. 26, 2016, the contents of which are hereby incorporated by reference.

FIELD OF THE INVENTION

The present invention relates to residential and commercial lighting fixtures. In particular, the present invention relates to ceiling light fixtures or similar luminaires.

BACKGROUND OF THE INVENTION

Ceiling panel light fixtures have been known for many years. They typically have a square or rectangular shape where each panel includes two, four, or more fluorescent tubes aligned in parallel. The light panels are typically mounted to a ceiling of a home, office, hospital, retail store, etc. Reflectors located at the top of the panel re-direct light downward, through a glass or plastic lens, and into the living space below. Technology has progressed to a point where light emitting diodes (LEDs) of sufficient brightness, color rendition, and cost are attractive to the consumer, and as such, LEDs are now used in ceiling lighting panels.

SUMMARY OF THE INVENTION

The present invention in various preferred embodiments is directed to a panel light fixture kit for mounting to a planar surface inside a dwelling. The dwelling may be a home, restaurant, shop, office, etc. The planar surface can be any generally flat surface such as a wall or ceiling, and if for a ceiling, the panel light may be installed as a flush mount fixture, or integrated in a T-grid drop ceiling. The panel light kit comprises a mounting plate with a perimeter lip having at least four side, wherein first opposed positions of the perimeter lip includes at least one eyelet slot and a spring finger catch proximate to the eyelet slot, and second opposed positions of the perimeter lip that include alignment notches. The mounting plate further includes an opening for passing electrical wiring therethrough and means for mounting the mounting plate to the planar surface such as using sheet metal screws, springs, clips, and other installation hardware known in the art.

The panel light kit further includes a frame having a flat bottom with a perimeter lip having at least four sides defining a space that is greater in size than the mounting plate. So when installed to a ceiling, for example, the smaller mounting plate can be fully covered by the frame so that the mounting plate is hidden from view by occupants of the dwelling. This way, the mounting plate is hidden from view by the larger, overlying and preferably decorative frame. Inside the frame are L-brackets disposed at opposite ends of the frame, and each L-bracket receives at least one pin therein. The frame contains a tunnel cover extending along a centerline of the frame. The tunnel cover functions as a housing for the electronics for the light fixture, and also serves as a tactile alignment guide for the user since during installation the user cannot visually check the alignment between the mounting bracket and the frame because the mounting bracket is hidden inside the frame.

A light source such as fluorescent tubes, LED tubes or bulbs, an LED strip, incandescent lamps, etc., wherein such a light source is mounted to the interior of the frame. The fluorescent tubes are powered by a ballast and the LED strip is powered by an LED driver, wherein the ballast or the LED driver is contained within the tunnel cover. Wiring for the light source extends out of the tunnel cover, through the opening in the mounting plate, and into the junction box or like electrical power supply behind the ceiling.

A light guide panel that reflects and transmits light from the light source is fitted to the bottom of the frame. It covers the fluorescent tubes if such is chosen for the light source, or alternatively, the light guide panel may be oriented so that its edge is aligned with the LED strip for an edge-lit effect. Other arrangements between the light source and the light guide panel are contemplated.

To start the installation for a flush mount application, the user or electrician mounts the mounting plate to the planar surface using various mounting means such as screws, nails, clips, springs, hooks, etc. To help the user attach the frame to the mounting plate, the user visually approximates the location of the tunnel cover located at the center of the frame and slides it into the notches of the mounting plate, and when the tunnel cover fully drops into the notches, the alignment between the two is fairly assured.

The mounting plate may optionally include alignment tabs positioned at opposite ends that have an L-shape or a hook-like configuration. The L-shaped alignment tabs catch the complementary shaped L-bracket of the frame, and this further ensures accurate alignment between the mounting plate and the frame. The present invention alignment features are useful as the user cannot visually check alignment of the mounting plate to the frame since the former is covered by the latter during installation. And being a ceiling install, the user cannot fit his or her head close enough to the ceiling to visually check alignment in such a low profile fixture. Thus, most of the installation is accomplished without benefit of visual guidance but rather through tactile feel.

As the frame is fitted to the mounting plate as guided by the above-mentioned structures, the pins of the frame enter the eyelet slots and slide along the eyelet slots. The pins slide into engagement with the spring finger catches; more precisely, the finger catches have elasticity and bias the pins into a groove to hold the pin in place. This action gives the user a tactile feedback of the pins snapping in place, also indicating to the user that installation of the frame to the mounting plate is complete with the two components locking together. The user then need not worry about the frame accidentally sliding off the mounting plate due to components not latching and being pulled apart by gravity.

In a preferred embodiment, the lip height and area of the bottom of the frame are sized to create sufficient volume so that the frame fully covers the smaller-dimensioned mounting plate. This way, the mounting plate, hardware, and wiring are completely hidden from view by the frame. The frame may thus have a decorative finish to match the décor of the dwelling or room.

For a T-grid application in a drop ceiling with a preexisting T-grid, the panel light fixture kit is integrated into the drop ceiling. The preferred embodiment panel light frame initially rests directly on the preexisting T-bar grid. In this application, the mounting plate of the kit is not needed.

The frame includes T-bar retainer brackets at the corners of the rectangular or square frame. The T-bar retainer bracket preferably includes an elongated, flat strip shape made from a pliable material. It has several fold lines or creases created along its length, and is anchored to the bottom of the frame at one end while the opposite end is free. By using finger pressure and manipulation, the user can plastically deform the T-bar retainer brackets to assume a generally hook shape. In its hook formation, the bent T-bar retainer bracket extends over the lip of the frame toward the T-bar. The user can then drive a sheet metal screw or like fastener through the T-bar bracket and T-bar to join the two. Once joined, the frame of the panel light fixture is anchored to the T-grid.

In the T-bar configuration, the kit includes a junction box that is mounted on top of the tunnel cover. All electrical wiring is fed into the junction box, which then routes the wires to the house supply line.

BRIEF DESCRIPTION OF THE DRAWINGS

FIG. 1 is an exploded view of a preferred embodiment panel light fixture for a flush mount application.

FIG. 2(a) is a top plan view of the panel light fixture.

FIG. 2(b) is a side elevational view of the panel light fixture.

FIG. 2(c) is a cross-sectional view of the panel light fixture taken along line B-B in FIG. 2(a).

FIG. 3 is a cross-sectional view of the panel light fixture taken along line A-A in FIG. 2(a).

FIG. 4 is an exploded view of a preferred embodiment panel light fixture for a T-grid drop ceiling application.

FIG. 5(a)-(c) are various view of a preferred embodiment frame with a junction box for a T-bar drop ceiling application.

FIG. 6 is a side elevational view of the frame.

FIG. 7 is an enlarged detail view of the frame mounted to a T-bar.

FIGS. 8(a) and 8(b) are views of the spring finger catch mounted to the mounting plate.

FIG. 9(a)-9(c) are various views of the spring finger catch.

FIG. 10(a)-(f) are various views of the mounting plate.

DETAILED DESCRIPTION OF THE PREFERRED EMBODIMENTS

The present invention in a preferred embodiment is directed to a panel light fixture kit for mounting to a planar surface inside a dwelling. The dwelling may be a home, restaurant, shop, office, etc. The planar surface can be any generally flat surface such as a wall or ceiling. If for a ceiling, the panel light may be installed as a flush mount fixture or integrated in a T-grid drop ceiling.

FIGS. 1 and 2(a)-(c) depict a preferred embodiment panel light fixture kit 10, which includes a mounting plate 12 and a frame 14. The mounting plate 12 and frame 14 are generally polygonal shapes such as a square or a rectangle, but other shapes are contemplated including a circle, ovals, pentagon, etc. The mounting plate 12 has a perimeter wall or lip 20 having four or more sides. Opposed sides of perimeter lip 20 have eyelet slots 22 formed therein. The eyelet slots 22 have an upward slope leading to a horizontal jog. The eyelet slots 22 are intended to receive guide pins from the frame 14 that slide along the slot and used to hold the mounting plate and frame together during installation.

The mounting plate 12 includes a pair of notches 26 formed on opposite sides of the perimeter lip 20, as seen in FIGS. 1 and 2(a). The notches 26 help align the mounting plate 12 with frame 14 by fitting over the tunnel cover 28 of the frame 14. The tunnel cover 28 is generally situated along a centerline of the frame, which acts as a datum for aligning the parts. This can be accomplished by feel when the tunnel cover 28 slides into the notch 26, the user knows the general alignment of the two parts for assembly is accurate. This alignment feature is advantageous, because the user cannot see mounting plate 12 because the frame 14 covers it hiding it from view during assembly. Further, if this is a ceiling flush mount application, it is difficult for the user to get his or head up high in the ceiling to look into the two components for a visual alignment.

The mounting plate 12 may optionally have another alignment guide, which are a pair of alignment tabs 24 located at the opposite ends of the mounting plate 12. As seen in FIGS. 1, 2(a), 8 and 10, the alignment tabs 24 preferably have an L-shape, and more preferably, have three or more preformed folds or creases, giving the L-shape a gentle curve. This helps the alignment tab 24 easily slide over the complementary part (i.e., the L-brackets 30 described below) extending from the frame 14 that receives the alignment tab 24. That is, as seen in FIG. 3, the vertical portion of the upright L of the L-bracket 30 slides along the vertical portion of the inverted L of the alignment tab 24. This provides further tactile guidance for the user during installation.

The mounting plate 12 is preferably stamped and formed from sheet metal. The mounting plate is shown in FIGS. 10(a)-10(f). FIG. 10(f) shows the mounting plate 12 flattened after coming from a sheet stamping machine, for example. The perimeter lip 20 is flat and needs to be bent 90 degrees to form the lip or wall. An opening 36 is formed in the mounting plate 12 to allow electrical wiring for the light fixture to pass to the junction box in the ceiling.

The frame 14 preferably has a cooking pan shape with a perimeter lip 16 having four or more sides with an open top and a generally flat bottom 18. The frame 14 is stamped and formed from sheet metal. Inside the frame 14 are preferably two L-brackets 30 attached to the bottom 18 at opposed positions of the perimeter lip 16. This can be seen in FIGS. 1 and 2(a). Round pins 32 pass through each L-bracket 30, preferably two pins per L-bracket. These round pins 32 during assembly slide into and along respective eyelet slots 22 in the mounting plate 12, thereby pulling the frame and mounting plate together. On the mounting plate 12 and proximate to each eyelet slot 22 is a spring finger catch 34, as best seen in FIGS. 8(a)-8(b). As seen in FIG. 9(b), the spring finger catch 34 is made from a spring steel and has a bump 38 followed by a 40. This structure ensures that, during installation, the pin 32 slides over the bump 38, perhaps slightly deforming it, and ultimately drops into the groove 40. The elasticity in the spring finger catch 34 restores the slightly deflected bump 38 and biases the pin 32 into the groove, creating a tactile snap. This action occurs at all four corners of the mounting plate 12 where each pin 32 engages the respective eyelet slot 22 and then the spring finger catches 34. This indicates to the user that the frame 14 is now positively locked to the mounting plate 12.

At or along the bottom 18 of the frame 14 is a light source 42, as seen in FIGS. 1 and 4. The preferred embodiment light source is a strip of LEDs that is powered by an LED driver contained within the tunnel cover 28. LED bulbs or LED tubes or the like are contemplated as well. In an alternative embodiment, one or more fluorescent tubes may be the light source with the ballast contained in the tunnel cover.

Also mounted to the bottom 18 of the frame 14 is a light guide panel 44. This panel 44 serves to transmit, reflect and diffuse light emitted by the light source 42. In a preferred embodiment, the LED strip 42 is aimed at the edge of the light guide panel 44 to create an edge-lit effect. Other arrangements between the light source and the light guide panel are contemplated such as back lit, front lit, direct lighting, etc.

The mounting plate 12 may have attachment means for mounting to a planar surface of a ceiling, wall, etc. The mounting means may be punch out holes that allow nails or screws to pass through to attach to the ceiling, or hooks, springs, claws, snaps, etc. to hold the mounting plate 12 to the planar surface.

FIGS. 4-7 illustrate a T-bar grid drop ceiling application for the present invention kit. In a preferred embodiment, all of the same structures described with the flush mount application are present, except the mounting plate 12 is omitted since it is not necessary in a drop ceiling. The kit also includes a junction box 46 that mounts to the tunnel cover 28, so the electronics inside the tunnel cover pass through an opening and are wired to the junction box 46, which wires then lead to the house electrical line. Inside at the four corners of the frame 14 are T-bar retainer brackets 48 mounted to the bottom 18. The T-bar retainer brackets 48 can be plastically bent under finger pressure, and have at least three preformed folds or creases.

As seen in FIG. 4, the frame 14 initially rests of the cross member on the T-bar 50 of the T-grid. The T-bar retainer brackets have a flat configuration and lie along the bottom when not used. Just prior to installation, the user uses finger pressure to bend the T-bar brackets 48 at the fold lines 52 to obtain a generally hook shape, as seen in FIG. 7, so that the T-bar brackets 48 extend over the frame's perimeter lip 16 and latch onto the re-existing T-bar 50 of the drop ceiling. Now a sheet metal screw or like fastener 54 can be driven through the T-bar 50 and the T-bar bracket 48 to lock the two together, thereby holding the frame 18 to the T-grid. T-bar retainer brackets 48 are made from a bendable steel strip that is anchored at one end to the frame bottom 18 and free at the opposite end to allow for the formation of the hook shape by the user under finger pressure.

While particular forms of the invention have been illustrated and described, it will be apparent that various modifications can be made without departing from the spirit and scope of the invention. It is contemplated that components from one embodiment may be combined with components from another embodiment.

What is claimed is:

1. A panel light fixture kit for mounting to a planar surface inside a dwelling, comprising:
   a mounting plate with a perimeter lip, wherein first opposed positions of the perimeter lip includes at least one eyelet slot and a spring finger catch proximate to the eyelet slot, and second opposed positions of the perimeter lip include alignment notches, and the mounting plate further includes an opening for passing electrical wiring therethrough and means for mounting the mounting plate to the planar surface;
   a frame having a bottom with a perimeter lip defining a space that is greater in size than the mounting plate so that the mounting plate is fully covered by the frame upon installation, wherein the frame includes opposed L-brackets disposed on the bottom that receive at least one pin therein, the frame further having a tunnel cover with an opening on top and disposed on the frame bottom along a centerline of the frame;
   a light source disposed within the frame and powered through wiring leading to the tunnel cover and through the opening in the mounting plate;
   a light guide panel disposed at the bottom of the frame; and
   wherein when the mounting plate is installed to the planar surface, the tunnel cover engages the alignment notch to align the frame to the mounting plate, and the pins are guided by the eyelet slots and biased into the spring finger catches to hold the frame to the mounting plate.

2. The panel light fixture kit of claim 1, wherein the light source includes an LED strip disposed along an interior of the frame perimeter lip and facing an edge of the light guide panel, and an LED driver powering the LED strip is contained within the tunnel cover.

3. The panel light fixture kit of claim 1, wherein the spring finger catch includes a bump and a groove in series.

4. The panel light fixture kit of claim 1, wherein the mounting plate includes a four-sided polygonal shape, and the frame includes a four-sided polygonal shape with four corners.

5. The panel light fixture kit of claim 4, wherein the tunnel cover includes a rectangular channel shape extending across the four-sided polygonal frame and the alignment notch includes a shape matching the rectangular shape of the tunnel cover.

6. The panel light fixture kit of claim 1, wherein the kit includes a junction box that is disposed on the top opening of the tunnel cover with electrical communication therebetween.

7. The panel light fixture kit of claim 4, wherein the frame includes a plurality of bendable T-bar retainer brackets disposed at each corner of the frame, each T-bar retainer bracket having preformed bend lines to be bent into a hook shape.

8. The panel light fixture kit of claim 7, wherein the bent T-bar retainer brackets include a rectangular shape with one end anchored to the frame and an opposite end extending over the perimeter lip of the frame.

9. The panel light fixture kit of claim 1, wherein the mounting plate includes alignment tabs at opposite ends thereof that engage the L-brackets.

10. A panel light fixture kit for mounting to a planar surface inside a dwelling, comprising:
    a mounting plate with a perimeter lip having at least four side, wherein first opposed positions of the perimeter lip includes at least one eyelet slot and a spring finger catch proximate to the eyelet slot, and second opposed positions of the perimeter lip include alignment notches, and the mounting plate further includes an opening for passing electrical wiring therethrough and means for mounting the mounting plate to the planar surface;
    a frame having a flat bottom with a perimeter lip having at least four sides defining a space that is greater in size than the mounting plate so that the mounting plate is fully covered by the frame upon installation, wherein the frame includes L-brackets disposed on opposite sides of the frame, and each L-bracket receives at least one pin therein, the frame having a tunnel cover extending along a centerline of the frame;
    a plurality of LEDs mounted along a strip, wherein the LED strip is disposed within the frame and powered via wiring leading to an LED driver located within the tunnel cover that is wired through the opening in the mounting plate;
    a light guide panel disposed at the bottom to the frame, wherein the LED strip is disposed proximate to an edge of the light guide panel; and
    wherein when the mounting plate is installed to the planar surface, the tunnel cover engages the alignment notch to align the frame to the mounting plate, and the pins are guided by the eyelet slots and biased into the spring finger catches to hold the frame to the mounting plate.

11. The panel light fixture kit of claim 10, wherein the tunnel cover includes three walls arranged in right angles, and the alignment notch is shaped to match the three-wall tunnel cover.

12. The panel light fixture kit of claim 10, wherein the frame includes a plurality of bendable T-bar retainer brackets disposed on the frame bottom, and each T-bar retainer bracket includes preformed bend lines deformable via finger pressure into a hook shape.

13. The panel light fixture kit of claim 10, wherein the kit includes a junction box that attaches to the tunnel cover.

14. The panel light fixture kit of claim 10, wherein the mounting plate includes L-shaped alignment tabs at opposite ends thereof that engage the L-brackets, and wherein each L-shaped alignment tab includes at least three flat surfaces angled with respect to each other to capture the L-bracket.

15. A panel light fixture kit, comprising:
a mounting plate with a perimeter lip, wherein first opposed positions of the perimeter lip includes at least one eyelet slot and a spring finger catch proximate to the eyelet slot, and second opposed positions of the perimeter lip include alignment notches, and the mounting plate further includes an opening for passing electrical wiring therethrough;

a frame having a bottom with a perimeter lip having at least four sides defining a space that is greater in volume than the mounting plate so that the mounting plate is fully covered by the frame upon installation, wherein the frame includes opposed L-brackets that each receives at least one pin therein, the frame having a tunnel cover disposed on the frame bottom;

a light guide panel disposed at the bottom to the frame;

a light source disposed at the frame bottom transmitting light to the light guide, wherein the light source is disposed within the frame and powered via wiring leading to the tunnel cover and through the opening in the mounting plate; and a plurality of bendable T-bar retainer brackets disposed at opposite sides of the frame bottom, each T-bar retainer bracket having preformed bend lines to be manually deformable.

16. The panel light fixture kit of claim 15, wherein the frame includes a four-sided pan shape and the tunnel cover is disposed along a centerline of the pan shape.

17. The panel light fixture kit of claim 15, wherein the kit includes a junction box that is disposed on the tunnel cover.

18. The panel light fixture kit of claim 15, wherein the mounting plate includes alignment tabs disposed at opposite ends thereof that engage the L-brackets.

* * * * *